Dec. 19, 1967  Q. BRODHEAD  3,358,616
INTERCHANGEABLE AND NESTING COMMODITY CARRIER
Filed Oct. 21, 1965  3 Sheets-Sheet 2
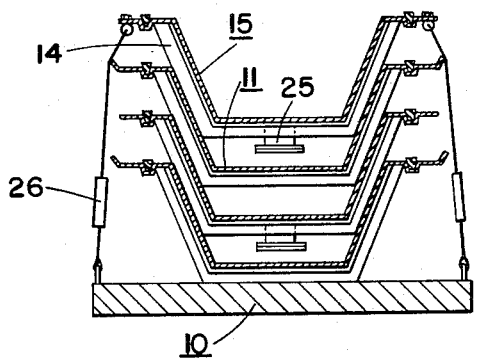
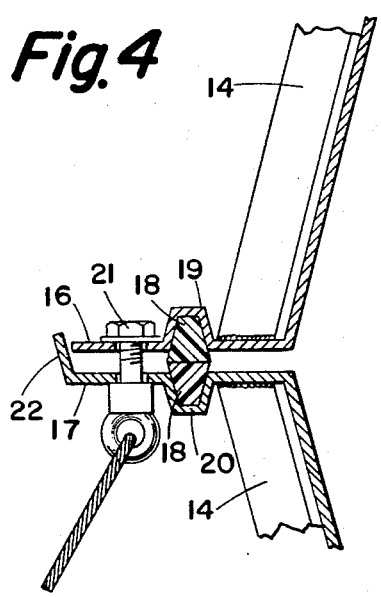
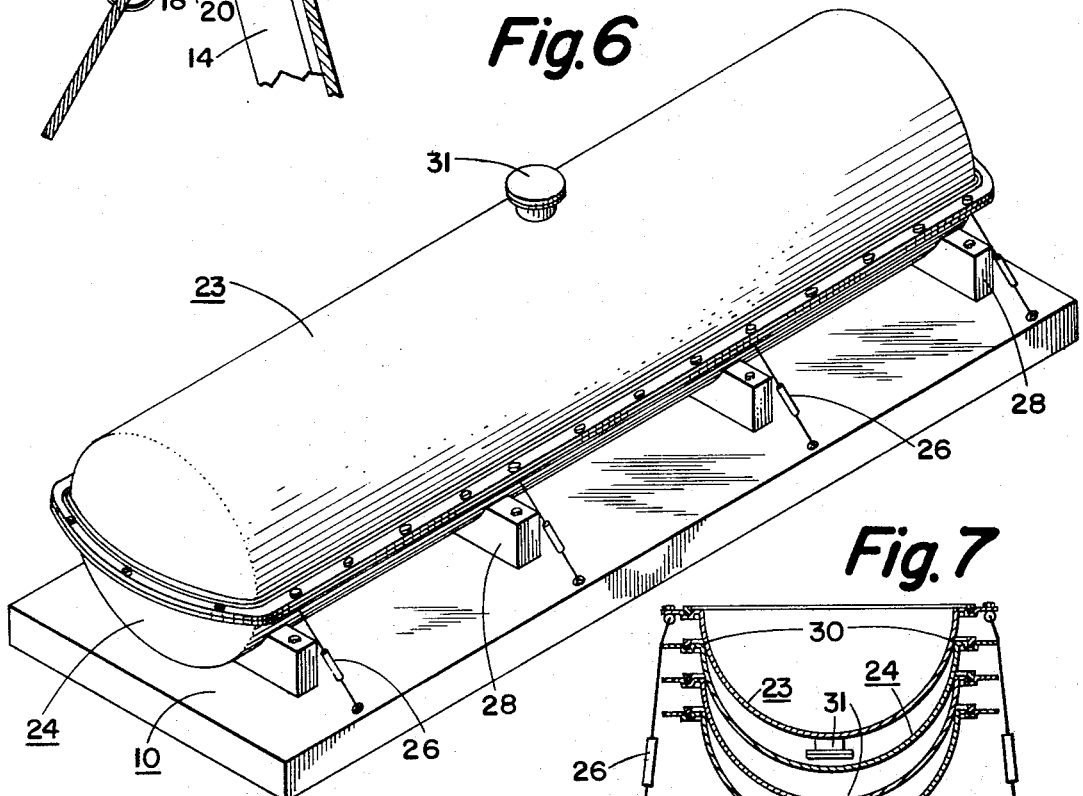
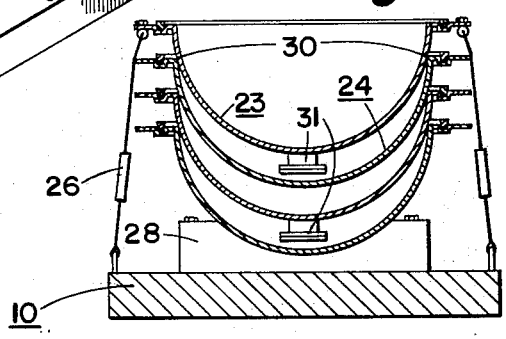

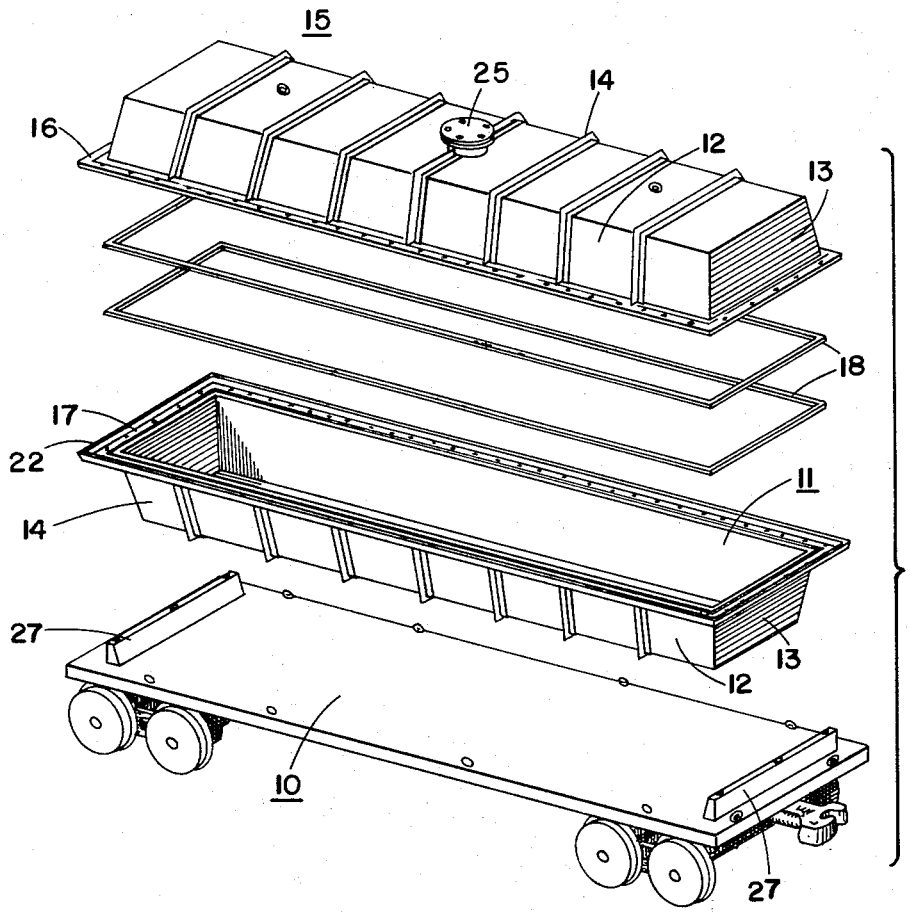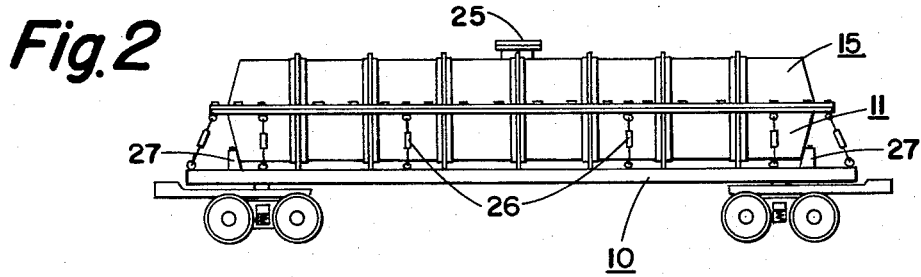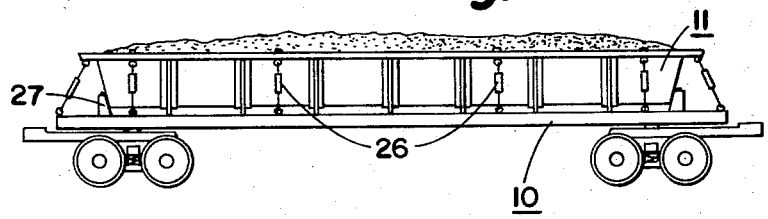

Dec. 19, 1967  Q. BRODHEAD  3,358,616
INTERCHANGEABLE AND NESTING COMMODITY CARRIER
Filed Oct. 21, 1965  3 Sheets-Sheet 3
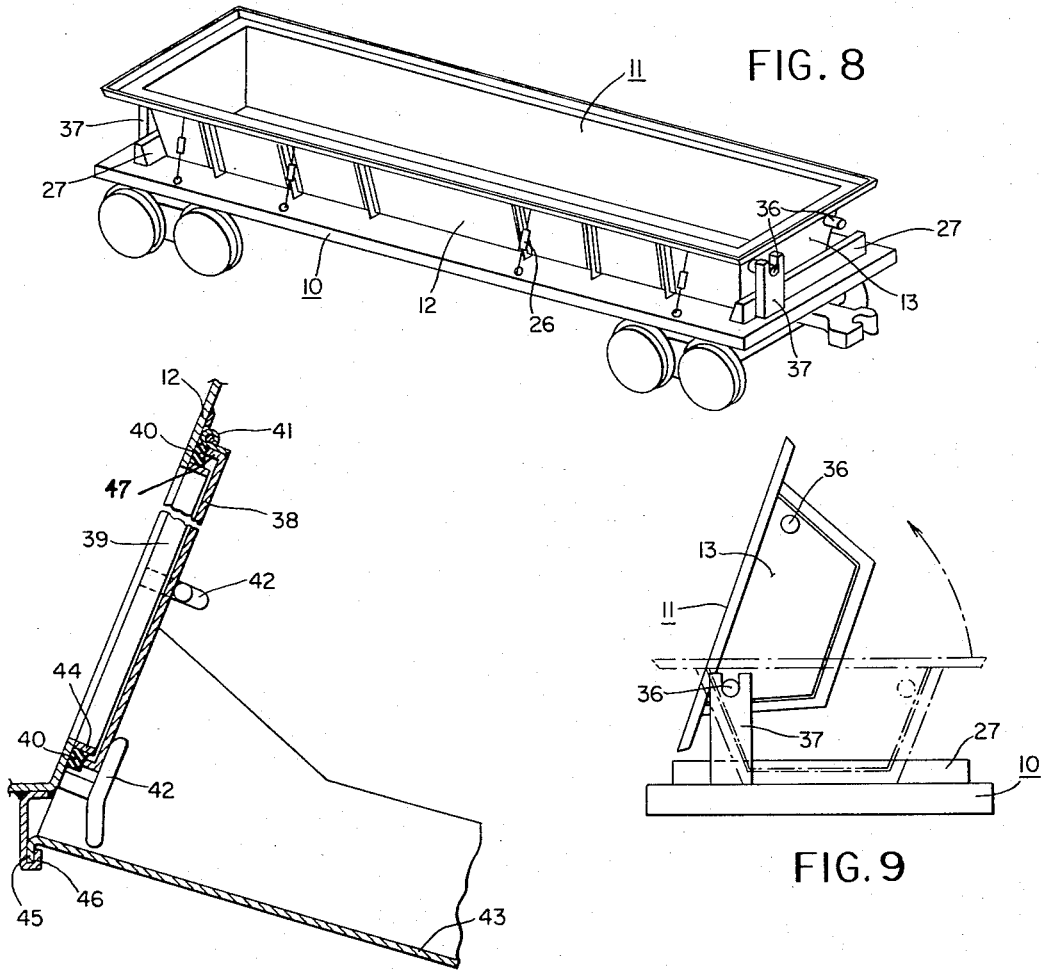
FIG. 8
FIG. 11
FIG. 9
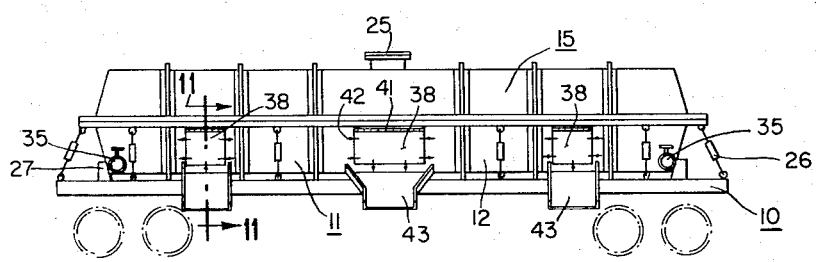
FIG. 10

United States Patent Office 3,358,616
Patented Dec. 19, 1967

3,358,616
INTERCHANGEABLE AND NESTING COMMODITY CARRIER
Quita Brodhead, 211 Atlee Road, Wayne, Pa. 19087
Filed Oct. 21, 1965, Ser. No. 505,592
1 Claim. (Cl. 105—366)

This application is a continuation-in-part of application Ser. No. 469,116 filed July 2, 1965 and relates to commodity carriers of the general class including railroad cars or roadway trailers and more specifically to a versatile commodity carrier having a top and bottom portion mounted on a flat wheeled vehicle wherein the top and bottom portion will form an enclosed structure when in a first position and will nest one within the other when in a second position as well as to means and apparatus associated with the commodity carrier to provide for removal of the commodity therein.

The requirements of modern commercial vehicles have emphasized the need for flexible, versatile and multi-purpose cargo carriers which are economical to use and operate, both from the standpoint of cost of construction as well as maximum utilization of the equipment involved. This requirement is most apparent to one when he sees the stream of commercial vehicles such as coal cars, freight cars or highway trailers which after having deposited their cargo at one destination then return empty to another destination at which they receive the next cargo.

Many of these commodity carriers are of special design or application which further lends to their inflexibility and nonusage on return trips as they cannot carry but the cargo of the type for which they are designed.

Further, these special types of commercial vehicles as described above, are both costly to produce as well as to operate.

There is at present no commercial commodity carrier available which meets the requirements of a modern commercial vehicle set out above.

Accordingly, it is an object of this invention to provide a flexible, versatile and multi-purpose commodity carrier which is both economical to produce and use which is of the type having for a given unit a first and second open gondola mounted or secured to a given wheeled vehicle wherein the first and second gondolas of a given unit when in a first position form an enclosed car which is capable of carrying any different number of commodities such as grain, coal, or gasoline and wherein the first and second gondolas of any number of units may be nested one within the other on a given wheeled vehicle for a return trip thus releasing additional wheeled vehicles for other loads such as machinery, trucks or other large objects normally carried on flat bed vehicles.

It is a further object of the present invention to provide flexible, versatile and multi-purpose commodity carriers having first and second gondolas which may be secured one to the other to form an enclosed car capable of carrying any different number of commodities and which is further secured to a given wheeled vehicle for transit to a given destination whereupon the enclosed car and its included cargo may, as a whole, be transferred from a given wheeled vehicle to another or to a stationary position.

It is still a further object of the present invention to provide means and apparatus associated with the commodity carrier which will provide for quick removal of the commodity therein either through the inclination of the gondola as a whole or by means of special discharge doors and chutes in the sides thereof.

Other objects and advantages of the present invention will become apparent from the following description wherein reference is made to the drawings in which:

FIG. 1 is an exploded isometric view of one embodiment of the present invention;

FIG. 2 is an elevation view of the embodiment of FIG. 1 shown in enclosed position;

FIG. 3 is an elevation view of the embodiment of FIGS. 1–2 without the upper section thereof;

FIG. 4 is a sectional view of a portion of the enclosed container of FIGS. 1–2 showing the unique joint and flange structure thereof according to the present invention;

FIG. 5 is a sectional view of the embodiment of FIGS. 1–2 showing the gondolas in nested relationship;

FIG. 6 is an isometric view of a further embodiment of the present invention;

FIG. 7 is a sectional view showing the gondolas of FIG. 6 in nested relationship;

FIG. 8 is an isometric view of a gondola and associated tilting means;

FIG. 9 is an end view of the gondola of FIG. 8 shown in tilted position;

FIG. 10 is a side view of a gondola and associated discharge doors and chutes; and FIG. 11 is a sectional view of a discharge door and chute taken through line 11—11 of FIG. 10.

The present invention as best seen in FIG. 1 utilizes a substantially flat wheeled vehicle 10 such as a flat roadway trailer or a railroad flat car, together with a first and second gondola 11 and 15 respectively.

The sides 12 and ends 13 of either gondola are flat and taper inwardly toward each other and toward the bottom or closed portion of the gondola. Ribs 14 are provided to give the required rigidity and strength to the outside of the gondola.

The second gondola 15 is of equal dimension, both in length and width as well as depth as that of the first gondola 11 so that when the second gondola 15 is placed in an inverted position upon the first gondola 11 as shown in FIG. 2 the peripheral flange 16 of the second gondola will engage and rest upon the peripheral flange 17 of the first gondola 11 as further shown in FIG. 4.

Gaskets 18 made of suitable material are placed into a recess 20 in the flange 17 of the first gondola 11 and a similar recess 19 in the flange 16 of the second gondola 15 whereupon the two gondolas when bolted together around their peripheral flanges by a suitable nut and bolt arrangement 21 will thus form a weather-proof and leak-proof car as shown in FIG. 2.

The peripheral flange 17 of the first gondola has an upturned and outwardly deflected rim 22 which serves to guide the peripheral flange 16 of the second gondola 15 into engagement with the flange 17 of the first gondola upon the mating of the two.

When the second gondola 15 is inverted from its position as shown in FIG. 1 and placed in apposed position to the first gondola 11, the two will nest one within the other as well as with other gondolas from other units as shown in FIG. 5.

The ribs or supporting members 14 of a given gondola will rest against the inside of the gondola into which it is nested, thus supporting the gondolas rigidly one within the other and yet in a manner which will prevent the gondolas from wedging one within the other. Further, these ribs also provide the necessary and proper clearance for the filler pipe 25 associated with the second gondola 15.

Suitable holddown or anchoring means such as turnbuckles or chain anchors 26 are used to secure the gondolas to the wheeled vehicle when in enclosed position as seen in FIG. 2 or when in nested position as seen in FIG. 5. Further, abutment members 27 are provided on the wheeled vehicle to secure the gondolas against forward and rearward movement. These abutment members are easily removable in order that the surface of the wheeled vehicle may be free of obstruction if desired.

A second embodiment of the present invention is shown in FIG. 6 wherein the first and second gondolas 24 and 23 respectively are semi-cylindrical in configuration and in which each employs the flange and gasket arrangement of the embodiment of FIG. 1.

Further, the gondolas are so dimensioned that they also nest one within the other as shown in FIG. 7 wherein it can be seen that a given gondola will be supported within the next gondola at points 30 along the side thereof due to the thickness of the material of which they are formed. This line contact along the sides of the gondola provides the necessary clearance for the filler pipe 31 of the second gondola 23 as well as allowing the gondolas to nest without wedging. Removable arcuate shaped supporting blocks 28 are provided to render support for the semi-cylindrical bottom gondola when it is positioned on a wheeled vehicle.

Due to the inherent rigidity of a semi-circular object, the embodiment of FIG. 6 need not employ the reinforcing ribs of that of FIG. 1.

The enclosed container formed by the first and second gondolas 23 and 24 as seen in FIG. 6 may be anchored to the wheeled vehicle upon which they rest in the same manner as that of the embodiment of FIG. 1. The gondolas may also be anchored to the wheeled vehicle when in nested position in the same manner as the gondolas of the embodiment of FIG. 1.

It will be appreciated that the commodity carrier of the present invention may, when in closed position as shown in FIGS. 2 and 6, provide an enclosed car which is capable of carrying any number of liquid commodities such as petroleum, oil, gasoline or chemicals. The same enclosed car may be used to convey bulk material which must be kept dry such as wheat, lime or cement.

Further, such commodities as coal, rock or ore, may be conveyed by the commodity carrier of the present invention by utilizing only one gondola as shown in FIG. 3.

If a liquid is being transported by the commodity carrier when in closed position, it is anticipated that both filling and discharging thereof may be accomplished by means of high volume pumps, etc. operating through the filler pipes 25 and 31 of the embodiments of FIGS. 2 and 6 respectively. However, if the consumer is not suitably equipped to remove the liquid commodity from the comodity carrier by means of pumps, then the same may be removed by means of liquid discharge valves 35 (FIG. 10) positioned in either end of the gondolas.

These liquid discharge valves 35 are appropriately dimensioned so as not to interfere with the nesting of the gondolas and the discharge valves may be used in conjunction with either of the embodiments of FIGS. 2 or 6.

It will be noted as shown in FIGS. 5 and 7 that the configuration of either embodiment of the gondolas provides a clearance space between these respective bottoms and tops when in nested relationship one to another. Accordingly, false bottoms may be provided in the gondolas to provide a slight inclination therein to facilitate the removal of liquids and this inclination may be toward one or both ends of the gondola, as anticipated by the position of the liquid discharge valves shown in FIG. 10, or inclined toward the center of the gondolas in which case the liquid discharge valves 35 would be centrally located.

Whenever dry commodities are being transported by an open gondola as shown in FIG. 3, the same may be quickly unloaded by inclining or tilting the entire gondola 11 in relation to the wheeled vehicle 10 as shown in FIGS. 8 and 9.

The gondola 11 is provided with pivot pins 36 disposed at either end thereof along an axis through one side of the gondola which pins cooperate with and pivot in standards 36 secured to the wheeled vehicle and likewise positioned at either end of the gondola.

Overhead hoisting apparatus or jacks positioned between the gondola and wheeled vehicle of the conventional nature may be employed to tilt the gondola and consequently dump the commodity therefrom into suitable hoppers disposed at the side of the commodity carrier.

The standards 37 like the abutment members 27 are removable from the wheeled vehicle 10 in order that the wheeled vehicle will be unobstructed and useful for other purposes. Further, the gondolas are provided with pivot pins 36 on either side thereof and provision is made on either side of the wheeled vehicle to secure the standards 37 so that the gondolas may be dumped to either side.

The commodity carrier of the present invention is also suitable for use with modern unloading methods employed in large industrial plants where the entire vehicle is revolved upsidedown.

In many instances the consumer to whom the commodity is shipped may not have the necessary equipment to remove the commodity from the gondola in the manner described above. Accordingly, the gondolas 11 of the present invention may be unloaded by means of a discharge door and chute arrangement shown in FIGS. 10 and 11.

This embodiment of the present invention utilizes one or more discharge doors 38 positioned over discharge posts 38 in the side wall 12 of the gondolas 11. Chutes 43 positioned below the discharge ports 39 will convey the material discharging from the post past the edge of the wheeled vehicle 10 and on to the hopper or bin in which it is to be stored.

Referring more specifically to FIG. 11, the discharge door 38 is secured to the side wall 12 of the gondola by means of a hinge 41 which will allow the discharge door to be swung upwardly and out of the way once the door is opened.

In order that those gondolas utilizing discharge doors may also be used for carrying liquids, a liquid tight seal is provided between the door and the side wall by means of a gasket 40 disposed between the side wall 12 and the downturned circumferential flange 47 of the discharge door 38. A gasket guard flange 40 disposed around the perimeter of the discharge port 39 helps protect the gasket 40 from injury due to the abrasive action of bulk materials during unloading thereof when the gondola is being used to transport non-liquid materials.

The discharge doors 38 are held closed and in firm engagement with the gasket 40 when not in use by a plurality of door clamps 42 which are preferably of the quick acting screw actuated type.

The chutes 43 are so designed that they can be quickly attached to and detached from their proper position on the side wall 12 of the gondola 11. This is accomplished by means of a curved chute support 46 secured to the bottom of the gondola into which fits a downturned chute support flange 45 disposed on the upper edge of the chute 43. A similar pair (not shown) of cooperating curved chute supports and chute support flanges are disposed vertically on either side of the discharge port 39 and sides of the chute 43 and respectively secured to the side wall of the gondola and sides of the chute. In this manner, the chute may be removed from the gondola by moving the same upwardly until the chute support flanges clear the curved chute supports.

The discharge ports and doors may be provided on either side of the gondola and any number thereof may be utilized as desired.

The discharge port and door arrangement has a further advantage in that dry material therein may also be unloaded from the commodity carrier even when in enclosed form as in FIG. 2.

By design, the dimensions of the discharge doors 38 and door clamps 42 as well as the dimensions of the pivot pins 36 will be such as not to interfere with the nesting characteristics of the gondolas.

While the liquid discharge valves 35 have been shown incorporated in the same gondola in FIG. 10 as the discharge doors 38 and the gondola pivoting arrangement shown alone in FIGS. 8 and 9, it will be appreciated that all three unloading arrangements or any combination thereof may be utilized in the gondola as industrial usage would indicate desirable. It should also be understood that while in the embodiments of FIGS. 1, 6 and 10, the top gondola differs from the bottom one by the addition of a filler pipe or the absence of discharge valves, pivot pins or discharge doors, this showing is for illustration purposes only and gondolas having filler pipes, discharge valves, pivot pins and discharge doors may be utilized equally as top or bottom units.

From the foregoing it will be appreciated that the commodity carrier of the present invention provides versatility in the manner in which the commodity therein may be dumped or removed therefrom.

Upon the commodity carrier reaching a given destination and having deposited its cargo at that point, any number of gondolas may be nested one within the other for the return trip and thus release additional wheeled vehicles for other cargo such as machinery or military equipment.

It is also an advantage of the present invention that the enclosed car when loaded may be transported by one means of conveyance such as by railroad flat car and when at its destination may be completely removed from the flat bed car and placed on a flat bed of a truck or deposited at the user's locality to use the material therefrom as he desires.

The gondolas of the commodity carrier of the present invention are of simple but rugged construction and of a type which is very economical to manufacture.

Also, the commodity carrier of the present invention can be quickly and easily converted from an enclosed car to an open car or nested one within the other.

Further, the gondolas can be easily cleaned as they may be removed one from the other and thus are readily accessible to any ordinary cleaning operation.

While advantageous embodiments of the present invention have been herein disclosed, it is to be understood that various changes and modifications may be made therein without departing from the spirit and scope thereof as defined in the appended claim.

What is claimed is:

A versatile commodity carrier system comprising in combination:
  at least one wheeled vehicle having a substantially flat and rectangular upper portion thereof for receiving a load,
  a plurality of identical open gondolas, each of which includes a rectangular base portion and opposed end walls and side walls inclined away from one another, respectively, and terminating by defining an open portion of said gondola of rectangular configuration parallel with said base portion, and of width and breadth substantially that of said flat and rectangular upper portion of said wheeled vehicle,
  a mating flange secured to said sidewalls and endwalls circumferentially thereof at their point of termination at said open portion and extending outwardly thereof in a plane parallel to said base portion, and
  a plurality of reinforcing and spacing members disposed on the outer surface of said sidewalls and said base portion, and extending away from said sidewalls and said base portion a distance less than that of said mating flange,
  a discharge port in one sidewall of said commodity carrier,
  a gasket guard flange disposed around the periphery of said discharge port and extending outwardly of said sidewall,
  a gasket disposed adjacent the outer circumference of said gasket guard flange,
  a discharge door including an inturned flange on the circumference thereof of configuration commensurate with said gasket, said door at one end thereof being connected to said sidewall by hinge means and means for holding said door and said circumferential flange thereof in sealing engagement with said gasket means, and
  said door extending away from said sidewall when in closed relationship a distance less than that of said spacing and reinforcing members whereby any one of said gondolas may be indiscriminately and interchangeably used with any other of said plurality of gondolas to form an enclosed commodity carrier when said gondolas are disposed on said wheeled vehicle in opposed relationship and, when an apposed relationship, a plurality of said gondolas may be nested one within another with said reinforcing and spacing ribs of one of said gondolas preventing wedging thereof within the gondola in which it is nested by engaging the inner surface thereof essentially in the line contact while maintaining the walls and base portions of each of said gondolas in predetermined spaced relationship one to another and in which said discharge door, when closed, will not interfere with nesting of said commodity carriers.

References Cited

UNITED STATES PATENTS

| | | | |
|---|---|---|---|
| 1,305,351 | 6/1919 | Gandek | 105—258 |
| 1,313,361 | 8/1919 | White | 105—256 |
| 1,373,052 | 3/1921 | Carrie | 105—366 |
| 2,071,355 | 2/1937 | Norbom | 105—366 |
| 2,513,450 | 7/1950 | Carlisle | 105—360 X |
| 2,671,573 | 3/1954 | Hedon et. al. | 220—5 |
| 3,025,948 | 3/1962 | Appelt | 206—65 |
| 3,043,465 | 7/1962 | Horner | 220—5 |
| 3,083,670 | 4/1963 | Harlender et al. | 105—366 X |
| 3,113,690 | 12/1963 | Swenck | 220—5 |
| 3,240,164 | 3/1966 | Flowers | 105—274 X |
| 3,252,431 | 5/1966 | Phillips | 105—360 |
| 3,282,228 | 11/1966 | Spees | 105—358 |

ARTHUR L. LA POINT, *Primary Examiner.*

DRAYTON E. HOFFMAN, *Assistant Examiner.*